United States Patent [19]

Palsule

[11] Patent Number: 5,625,011
[45] Date of Patent: Apr. 29, 1997

[54] MOLECULAR COMPOSITES, PROCESS FOR THE PREPARATION OF SAID COMPOSITES AND THEIR USES

[75] Inventor: Sanjay Palsule, Juniper Green, Scotland

[73] Assignee: Agence Spatiale Europeenne, Paris, France

[21] Appl. No.: 267,583

[22] Filed: Jun. 29, 1994

[30] Foreign Application Priority Data

Jun. 29, 1993 [FR] France .................... 93 07888

[51] Int. Cl.$^6$ .................... C08L 79/08
[52] U.S. Cl. .................... 525/431; 525/421; 525/425; 525/433
[58] Field of Search .................... 525/431, 421, 525/425, 437

[56] References Cited

U.S. PATENT DOCUMENTS

| | | | |
|---|---|---|---|
| 4,387,193 | 6/1983 | Giles, Jr. .................... | 525/431 |
| 4,631,318 | 12/1986 | Hwang et al. .................... | 525/432 |
| 4,735,999 | 4/1988 | Patterson et al. .................... | 525/431 |
| 4,816,527 | 3/1989 | Rock .................... | 525/431 |
| 4,977,223 | 12/1990 | Arnold et al. .................... | 525/432 |
| 5,387,639 | 2/1995 | Sybert et al. .................... | 524/537 |

FOREIGN PATENT DOCUMENTS

| | | |
|---|---|---|
| 0329956 | 8/1989 | European Pat. Off. . |
| 0417778 | 3/1991 | European Pat. Off. . |

*Primary Examiner*—Ralph H. Dean
*Attorney, Agent, or Firm*—Sughrue, Mion, Zinn, Macpeak & Seas

[57] ABSTRACT

The invention relates to molecular composites including a rigid reinforcing thermoplastic polymer dispersed on a molecular scale in a flexible organosiloxane/thermoplastic polymer copolymer, to a process for the preparation of the said composites and to a material with a surface enriched in siloxane, obtained from the said molecular siloxane composites, and to the uses of said composites and of the said material, in particular for aerospace construction.

14 Claims, No Drawings

MOLECULAR COMPOSITES, PROCESS FOR THE PREPARATION OF SAID COMPOSITES AND THEIR USES

The present invention relates to a new class of siloxane derivatives which can be employed in the aerospace industry.

Polymers conventionally employed in the aerospace industry, such as polyimides, polyesters and carbon/epoxy composites, have the disadvantage of being rapidly degraded under the thermooxidative attack by atomic oxygen in a low Earth orbit.

It is known that polysiloxanes are stable in the environment of the low Earth orbit. A review of the effects of atomic oxygen on polysiloxanes and on other polymers has been published, for example, by Dauphin ["Atomic oxygen: A Low orbit Plague", in: Looking Ahead for Materials and Processes, Material Science Monographs, 41 (Eds. J. de Bossu, G. Briens, and P. Lissacs), Elsevier Science Publishers, Amsterdam, pp. 345–367, (1987)]. However, polysiloxanes have mediocre thermal and mechanical properties and a low glass transition temperature, which result from the low energy of cohesion between the polymer chains of which they consist, and make them useless as structural materials for space vehicles.

There are also known copolymers resulting from the copolymerization of siloxane monomers with monomers which usually form part of the composition of thermoplastic polymers; these copolymers will be referred to as "organosiloxane/thermoplastic polymer copolymers" in the description which follows.

Just like polysiloxanes, organosiloxane/thermoplastic polymer copolymers do not have a glass transition temperature or mechanical properties that are compatible with use as structural materials for space vehicles.

Some mixtures of flexible organosiloxane/thermoplastic polymer copolymers with thermoplastic polymers have been described as having high glass transition temperatures. However, they are not considered to have the mechanical properties needed in order to be employed as structural materials for space vehicles. For example, Arnold et al., [High Performance Polymers, vol. 2, p. 83, (1990] have developed a mixture of polybenzimidazole and of polysiloxaneimide block copolymer, at the surface of which the siloxane predominates. Studies in an environment simulating the low Earth orbit conditions, as well as the study of the action of atomic oxygen on these mixtures, have shown that the siloxane present at the surface is converted into inorganic silicate in the presence of atomic oxygen. The glass transition temperatures of these mixture are high, but no indication concerning their mechanical properties is given.

Patel et al., [Macromolecules, vol. 21, pp. 2689–2696, (1988)] have developed a mixture of polysulphone/copolymerized polysiloxane and polysulphone in which the enrichment of the surface in siloxane was relatively high. On the other hand, no result concerning the reinforcement on a molecular level of the siloxane copolymer in the mixture is provided, and no study relating to the thermal and mechanical properties of the mixture has been carried out.

Injection moldable blends of silicone copolymer and polyetherimide (which is not a rigid thermoplastic polymer are described in EP 0 329 956 and U.S. Pat. No. 4,387,193. These materials are not reinforced at molecular level, and need the addition of reinforcing material to increase their mechanical properties.

Furthermore, materials consisting of a polymer with a flexible helical structure and reinforced on a molecular level by a rodlike rigid polymer are known by the name of "molecular composites". For a review of the main molecular composites and of their properties see, for example, Pawlikoski et al.: [Ann. Rev. Mater. Sci. vol. 21, pp. 159–184, (1991)]. Molecular composites are prepared by mixing their consonants in solution, at concentration lower than the critical concentration point defined for the ternary system: rigid polymer/flexible copolymer/solvent, and rapidly coagulating the mixture.

U.S. Pat. No. 4,631,318 describes a molecular composite as a material consisting of a rigid reinforcing polymer dispersed on a molecular level in a thermoplastic polymer with a flexible helical structure. This molecular composite is analogous to a fibre-reinforced composite.

Hwang et al. [J. Macromol. Sci. Phys., vol. B 22(2), pp. 231–257, (1983)] have developed a molecular composite consisting of poly-p-phenylenebenzobisthiazole and of poly-2,5(6)benzimidazole, which has excellent tensile properties.

Takayanagi et al. [J. Macromol. Sci. Phys., vol. B 17(4), p. 591, (1980)] have developed molecular-level composites by dispersing rigid; microfibrils of rigid aromatic polyamides in flexible aliphatic polyamides.

Despite the known thermal and mechanical properties of molecular composites, no study has made it possible to end in the development of molecular composites which have specific surface characteristics capable of enabling the material to be stable in the low Earth orbit environment in the presence of molecular oxygen. In particular, no molecular composite having a surface preferentially enriched in one of its components has been known until now.

However, according to the present Invention, it has been now discovered that a flexible organosiloxane polymer can be reinforced at a molecular level with a rigid thermoplastic polymer, and this makes it possible to obtain a new class of oxidation-resistant molecular composites called "molecular siloxane composites" hereinafter, in which the thermal and mechanical molecular-level reinforcement of the siloxane copolymer by the rigid thermoplastic polymer by the rigid thermoplastic polymer is accompanied by a siloxane-enriched surface which stabilizes the material in the low Earth orbit environment and allows it to withstand the attack by atomic oxygen.

The subject of the present invention is a molecular composite called molecular siloxane composite, characterized in that it includes a rigid reinforcing thermoplastic polymer dispersed on a molecular scale in a flexible organosiloxane/thermoplastic polymer copolymer.

The molecular siloxane composites in accordance with the invention are analogous on a molecular scale to fibre-reinforced quasiisotropic composites.

The flexible organosiloxane/thermoplastic polymer copolymer and the rigid thermoplastic polymer, which form a molecular siloxane composite in accordance with the invention, are thermodynamically miscible. A molecular siloxane composite in accordance with the invention therefore has a single glass transition point which is intermediate between that of the two polymers of which it consists.

According to a preferred embodiment of the present invention the surface of the said molecular siloxane composite is enriched in siloxane.

When a molecular composite in accordance with the invention is placed in an environment such as that of the low Earth orbit the siloxane which predominates at the surface of the said composite reacts with atomic oxygen to form a protective layer of silica at the surface.

The molecular siloxane composites in accordance with the invention have thermal and mechanical properties which are superior to those of the organosiloxane/thermoplastic polymer copolymers and of the mixtures of organosiloxane/thermoplastic polymer copolymers with flexible thermoplastic polymers known in the prior art, which proves the existence of a molecular-scale reinforcement of the flexible organosiloxane/thermoplastic polymer copolymer by the rigid thermoplastic polymer.

The molecular siloxane composites in accordance with the invention therefore constitute a new material which can be employed in particular as structural material for aerospace. In fact, by virtue of the thermal and mechanical properties and of the surface properties of the molecular siloxane composites in accordance with the invention, in a low Earth orbit this material maintains its dimensional stability and its thermomechanical properties, stands up to the space environment (that is to say in particular to ultraviolet radiation and to space debris) and additionally maintains these characteristics despite the cyclic thermal changes which take place in a low Earth orbit.

All polysiloxane copolymers with a thermoplastic polymer of the linear, grafted or block type can be employed to form the "flexible organosiloxane/thermoplastic polymer copolymer" component of the molecular siloxane composite in accordance with the invention. As nonlimiting examples of such copolymers there will be mentioned:
—polydimethylsiloxane/polyetherimide,
—polydimethylsiloxane/polycarbonate,
—polydimethylsiloxane/polysulphone,
—polydimethylsiloxane/polyamideimide,
—polydimethylsiloxane/polyester,
—polydimethylsiloxane/polyesteramide,
—polydimethylsiloxane/polyaryl ether,
—polydimethylsiloxane/polystyrene,
—polydimethylsiloxane/polymethyl methacrylate, and the like.

All thermoplastic polymers in which the chains are rigid because of a high rotational energy barrier of the structural units of which they consist can be employed as rigid reinforcing polymers for implementing the present invention. Such polymers are, for example and without any limitation being implied, poly-p-phenylene terephthalamide, polyamideimide, poly-p-benzamide, poly-p-phenyleneoxydiphenyleneterephthalamide, poly-p-phenylenebenzobisthiazole, poly-p-phenylenebenzobisoxazole, poly-p-phenylenes containing a linear chain, and the like.

The molecular siloxane composites in accordance with the invention may include any proportion of the rigid polymer and of the flexible organosiloxane/thermoplastic polymer copolymer; for example, they may include between 1 and 98% by weight of the flexible organosiloxane/thermoplastic polymer copolymer.

Another subject of the present invention is a process for the preparation of the molecular siloxane composites as defined above.

This process is characterized in that it includes the following stages:

a) a step during which an appropriate quantity of the rigid thermoplastic polymer is dissolved in a suitable solvent and an appropriate quantity of the flexible organosiloxane/thermoplastic polymer copolymer is dissolved separately, in the same solvent as that employed for dissolving the rigid thermoplastic polymer, until completely dissolved;

b) a step during which the solutions obtained in step a) are mixed homogeneously;

c) a step during which the solution obtained at the end of stage b) is added to at least 20 times its volume of water, which causes the formation of flocs of molecular siloxane composite in suspension in water;

d) steps of recovery, of washing and of drying of the said flakes of molecular siloxane composite.

According to a preferred embodiment of the process in accordance with the present invention the solution obtained at the end of step b) is added to approximately 50 times its volume of water.

According to another preferred method of implementing the process in accordance with the invention the drying of the said flakes includes a step of drying in a vacuum oven at a temperature of approximately 70° C. for 12 to 48 hours, then at a temperature of approximately 150° C. for 12 to 48 hours and, finally, at a temperature approximately 20° C. higher than the glass transition temperature of the rigid thermoplastic polymer for 12 to 48 hours.

To guide the choice of a solvent making it possible to implement the process in accordance with the invention, it will be noted that a suitable solvent must make it possible to dissolve the rigid thermoplastic polymer as well as the flexible organosiloxane/thermoplastic polymer copolymer without degrading the structure of the polymer chains. The choice of this solvent is therefore related to the chemical structures of both polymers. Insofar as the solvent for the organosiloxane compolymer is concerned, the solvent which dissolves the organic component of the said copolymer must be chosen.

Solvents which are suitable for most polymers are known; reference may be made, for example, to the list published by Fuchs in the Polymer Handbook [Brandrup & Immergut (Eds.); John Wiley, N.Y., (1990)].

In the case of a polymer for which no description of the desirable solvent is available, a person skilled in the art can easily determine whether a particular solvent is suitable by carrying out simple tests; for example attempts may be made to dissolve separately the rigid polymer and the flexible organosiloxane/thermoplastic polymer copolymer in a quantity of 10% by weight in the solvent to be tested and a check may be made, after stirring for 12 to 36 hours, whether the dissolution is complete or incomplete.

On the basis of the literature data and of the tests indicated above, it has been found, for example, that the polyamideimide (in the form of its polyamic acid precursor) and poly-p-phenyleneoxydiphenyleneterephthalamide can be dissolved by dimethylacetamide or N-methylpyrrolidinone, in the presence of 1 or 2% of calcium chloride (molar percentage). Other rigid polymers such as poly-p-phenyleneterephthalamide and polybenzobisthiazole can be dissolved using sulphuric acid.

Flexible organosiloxane copolymers such as polydimethylsiloxane/polyetherimide or polydimethylsiloxane/polyamideimide can be dissolved using dimethylacetamide or using N-methylpyrrolidinone.

Unexpectedly, and in contrast with the processes of preparation of molecular composites of the prior art, the process of the Invention does not necessitate to define a critical concentration point and to operate at a concentration lower than said critical concentration point.

A process for the preparation of siloxane composites in accordance with the invention preferably includes the following steps:

1) dissolving the rigid polymer (whose glass transition temperature has been determined beforehand) in a suitable solvent, to obtain a solution containing approximately 10% by weight of the said polymer;

2) dissolving the flexible organosiloxane/thermoplastic polymer copolymer (whose glass transition temperature has been determined beforehand) in the same solvent as that employed for step 1, in order to obtain a solution containing approximately 10% by weight of the said polymer;

3) mixing the solutions obtained in stage 1 and in step 2, with stirring, to obtain a homogeneous solution;

4) coagulating the solution obtained at the end of step 3 in a large volume of water, in order to obtain flakes of molecular siloxane composite in suspension in water;

5) filtering the flakes/water mixture to collect the flake of molecular siloxane composite;

6) carefully washing the flakes with running water to remove all solvent residues;

7) washing the flakes obtained at the end of stage 6 in acetone to remove the aqueous wash residues;

8) drying the flakes washed with acetone in an air oven to remove a maximum quantity of residual solvent and of the wash liquids;

9) drying the flakes obtained at the end of step 8 in a vacuum oven at a temperature of approximately 70° C. for two days, then at a temperature of approximately 150° C. for two days and, finally, at a temperature approximately 20° C. higher than the glass transition temperature of the rigid polymer for two days.

The flakes of molecular siloxane composite in accordance with the invention can then be converted, by any technique known per se, for example may be moulded to the desired shape, and make it possible to obtain a material the surface of which is enriched in siloxane.

Also in accordance with the invention, since no critical concentration point is to be taken in account in its process of obtention, a molecular siloxane composite in accordance witch the invention can be prepared by the melt-blending or injection-moulding technique.

For instance, polyamide-imide and polysiloxane-imide can be blended, and the mixture extruded at a temperature above 303° C.

According to a preferred embodiment the material based on molecular siloxane composite in accordance with the present invention is an isotropic material.

According to another preferred embodiment the material based on molecular siloxane composite in accordance with the present invention is an anisotropic material.

The formation of an isotropic material or of an anisotropic material is determined by the proportion of rigid thermoplastic polymer. In fact, if the percentage of rigid thermoplastic polymer exceeds a certain threshold, a preferential alignment of the chains of the said polymer is observed and this imparts an anisotropic structure to the molecular composite.

The threshold from which an anisotropic material is obtained can vary depending on the rigid polymer/flexible copolymer system employed. However, a person skilled in the art can easily determine the appropriate percentage of rigid thermoplastic polymer by carrying out a few tests and by verifying the isotropic or anisotropic nature of the molecular siloxane composite obtained, using a scanning electron microscope.

Pressure moulding of the flocs is advantageously undertaken at a temperature approximately 30° C. higher than the glass transition temperature of the rigid thermoplastic polymer. For example, a film of molecular siloxane composite in accordance with the invention can be obtained in this way.

The present invention will be better understood with the aid of the additional description which is to follow, which refers to examples of preparation of molecular siloxane composites in accordance with the invention.

It should be clearly understood, however, that these examples are given solely by way of illustration of the subject of the invention and do not constitute any limitation whatsoever thereof.

EXAMPLE 1

The rigid polymer employed is the polyamideimide (PAI) marketed under the name of Torlon 4203 by the company Amoco Performance Products Inc. The flexible organosiloxane/thermoplastic polymer copolymer employed is a polysiloxane-imide (PSI) copolymer containing 37% by weight of siloxane and marketed under the name of Siltem 1500 by the company G E Plastics.

15 g of polyamideimide in the form of its polyamic acid precursor were dissolved in 150 ml of dimethylacetamide at a temperature of 60° C.

85 g of PSI were separately dissolved in 850 ml of dimethylacetamide at 60° C. The two solutions were mixed with stirring for 48 hours in order to obtain a homogeneous solution.

This solution was then added to a volume of 5 liters of water, and this causes the precipitation of the molecular siloxane composite in the form of flocs in suspension in water. The flakes are next recovered by filtration and then carefully washed with running water to remove all solvent residues, and then with acetone to remove the aqueous wash residues.

The flakes are next dried in an air oven and then in a vacuum oven at a temperature of approximately 70° C. for two days and then at a temperature of approximately 150° C. for two days and finally at a temperature of 313° C. for two days.

At the end of this heating the polyamic acid is converted into polyamideimide with water elimination. Films of a thickness varying between 0.1 and 1 mm are obtained by compression-moulding the flocs at a temperature of 329° C. The material obtained is isotropic. This material was called ST-8515.

EXAMPLE 2

A molecular siloxane composite was prepared according to the protocol described in Example 1 from 30 g of PAI dissolved in 300 ml of solvent and from 70 g of PSI dissolved in 700 ml of solvent. The material obtained is isotropic. This material was called ST-7030.

EXAMPLE 3

A molecular siloxane composite was prepared according to the protocol described in Example 1 from 50 g of PAI dissolved in 500 ml of dimethylacetamide and 50 g of PSI dissolved in 500 ml of dimethylacetamide. This material was called ST 5050.

EXAMPLE 4

A molecular siloxane composite was prepared according to the protocol described in Example 1 from 70 g of PAI dissolved in 700 ml of dimethylacetamide and 30 g of PSI dissolved in 300 ml of dimethylacetamide. This material was called ST 3070.

EXAMPLE 5

A molecular siloxane composite was prepared according to the protocol described in Example 1 from 85 g of PAI dissolved in 850 ml of dimethylacetamide and 10 g of PSI dissolved in 150 ml of dimethylacetamide. This material was called ST 1585.

EXAMPLE 6

LABORATORY TESTS:

The degassing tests were performed in accordance with the protocol described in Standard ESA-PSS-01-702.

The results of these tests are shown in Table I below.

TABLE I

| MATERIAL | TML[a] (%) | RML[b] (%) | VMC[c] (%) |
|---|---|---|---|
| ST-8515 | 0.30 | 0.08 | 0.01 |
| ST-7030 | 0.66 | 0.08 | 0.01 |

[a]Total mass loss
[b]Recoverable mass loss
[c]Condensable volatile matter collected The glass transition temperatures and the mechanical properties were also determined and the results are assembled in Table II below.

TABLE II

| MATERIAL | GTT[a] (°C.) | STRENGTH (MPa) | MODULUS (MPa) | ELONGATION (%) |
|---|---|---|---|---|
| SI | 172 | 18.90 | 23.89 | 40 |
| ST-8515 | 187 | 21.25 | 98.96 | 38 |
| ST-7030 | 199 | — | — | — |
| ST-5050 | 222 | — | — | — |
| ST-3070 | 279 | 31.56 | 374.6 | 13 |
| ST-1585 | 283 | — | — | — |

[a]Glass transition temperature

TESTS IN REAL SPACE ENVIRONMENT:

The molecular siloxane composites obtained in Examples 1 and 2 were exposed to the low Earth orbit environment during the ESA BIOPAN mission over a period of 2 weeks. The sample was exposed for two weeks to an atomic oxygen fluence of $8.66 \times 10/20$ atoms/cm$^2$, to an ultraviolet irradiation equivalent to 12 hours 30 min of solar irradiation and also to cyclic thermal variations, as well as to the action of space debris and of the space vacuum.

Table III shows the results of measurements performed by X-Ray photon spectroscopy on the ST-8515 ST-7030 composites before and after exposure to the low Earth orbit environment in the course of the BIOPAN mission.

TABLE III

| MATERIAL | PEAK | ATOMIC PERCENTAGE | BE[a] | PMHW[b] |
|---|---|---|---|---|
| ST-8515 unexposed | C 1s | 60.0 | 287.0 | 2.34 |
|  | O 1s | 23.0 | 534 | 2.38 |
|  | Si 2p | 17.0 | 104.5 | 1.97 |
| ST-8515 exposed | C 1s | 42.8 | 289.0 | 2.25 |
|  | O 1s | 33.6 | 536.6 | 2.65 |
|  | Si 2p | 23.6 | 107.5 | 2.67 |
| ST-7030 unexposed | C 1s | 69.1 | 287.0 | 2.62 |
|  | O 1s | 16.9 | 534.8 | 2.10 |
|  | Si 2p | 14.0 | 104.1 | 2.45 |
| ST-7030 exposed | C 1s | 26.7 | 288.4 | 2.69 |
|  | O 1s | 40.9 | 536.8 | 2.48 |
|  | Si 2p | 32.4 | 107.5 | 2.79 |

[a]bond energy
[b]peak mid-height width

The X-Ray photons are emitted by an MgK source, at normal incidence relative to the sample to be tested. The measurement is performed over a depth of 50 Å. It is found that in each of the samples the atomic percentage of carbon has decreased after exposure, whereas those of silicon and oxygen have increased. Furthermore, the peak mid-height width (PMHW) increases for the 2 p peak of silicon and for the 1 s peak of oxygen, whereas that of the 1 s peak of carbon remains practically unaltered. This indicates an increase in the number of silicon-oxygen bonds, which results from the conversion of the siloxane into a protective silicone layer.

The increase in the oxygen content of the sample reflects the conversion of the siloxane to silica and confirms the stability of the material in the environmental conditions of the low Earth orbit. These results also confirm that the material does not undergo any degradation due to the UV, to space debris or to cyclic thermal variations.

I claim:

1. A molecular composite, comprising a rigid reinforcing thermoplastic polymer dispersed on a molecular scale in a flexible organosiloxane/thermoplastic polymer copolymer, wherein said rigid reinforcing thermoplastic polymer is a polyamideimide.

2. The molecular composite according to claim 1, characterized in that the surface of the said molecular composite is enriched in siloxane.

3. The molecular composite according to claim 1, wherein the flexible organosiloxane/thermoplastic polymer copolymer is selected from the group consisting of:
   —polydimethylsiloxane/polyetherimide,
   —polydimethylsiloxane/polycarbonate,
   —polydimethylsiloxane/polysulphone,
   —polydimethylsiloxane/polyamideimide,
   —polydimethylsiloxane/polyester,
   —polydimethylsiloxane/polyesteramide,
   —polydimethylsiloxane/polyaryl ether,
   —polydimethylsiloxane/polystyrene, and
   —polydimethylsiloxane/polymethyl methacrylate.

4. The molecular composite according to claim 1, characterized in that the flexible organosiloxane/thermoplastic polymer copolymer is a polydimethylsiloxane/polyetherimide block copolymer.

5. The molecular composite according to claim 1, characterized in that it contains between 1 and 98% by weight of the flexible organosiloxane/thermoplastic polymer copolymer.

6. A process for the preparation of a molecular composite wherein a rigid reinforcing thermoplastic polymer is dispersed on a molecular scale in a flexible organosiloxane/thermoplastic polymer copolymer comprising the following steps of:

a) dissolving an appropriate quantity of the rigid thermoplastic polymer in a suitable solvent and separately dissolving an appropriate quantity of the flexible organosiloxane/thermoplastic polymer copolymer in the same solvent, until completely dissolved, wherein said rigid reinforcing thermoplastic polymer is a polyamideimide;

b) homogeneously mixing the solutions obtained in step a);

c) adding the solution obtained at the end of step b) to a large volume of water, which causes the formation of flecks of molecular siloxane composite in a suspension in water;

d) recovering said flecks of molecular siloxane composite by washing and drying the same.

7. The process according to claim 6, characterized in that the drying of the flecks includes a step of drying in a vacuum oven at a temperature of approximately 70° C. for 12 to 48 hours, then at a temperature of approximately 150° C. for 12 to 48 hours and, finally, at a temperature approximately 20° C. higher than the glass transition temperature of the rigid reinforcing thermoplastic polymer for 12 to 48 hours.

8. A material whose surface is enriched in siloxane, wherein the material is obtained by moulding a molecular composite comprising a rigid reinforcing thermoplastic polymer dispersed on a molecular scale in a flexible organosiloxane/thermoplastic polymer copolymer, wherein said rigid reinforcing thermoplastic polymer is a polyamideimide.

9. The material according to claim 8, characterized in that the moulding of the molecular composite is performed under pressure at a temperature 30° C. higher than the glass transition temperature of the rigid thermoplastic polymer.

10. The material according to claim 8, wherein the material is an isotropic material.

11. The material according to claim 8, wherein the material is an anisotropic material.

12. A process for the preparation of a molecular composite wherein a rigid reinforcing thermoplastic polymer is dispersed on a molecular scale in a flexible organosiloxane/thermoplastic polymer copolymer, characterized in that the composite is obtained by melt-blending, wherein said rigid reinforcing thermoplastic polymer is a polyamideimide.

13. An aerospace construction comprising a molecular composite wherein a rigid reinforcing thermoplastic polymer is dispersed on a molecular scale in a flexible organosiloxane/thermoplastic polymer copolymer, wherein said rigid reinforcing thermoplastic polymer is a polyamideimide.

14. An aerospace construction comprising the material according to claim 8.

* * * * *